Jan. 2, 1968 M. L. CROSSWAIT 3,361,836
PREPARATION OF CHLOROPRENE
Filed Nov. 13, 1964
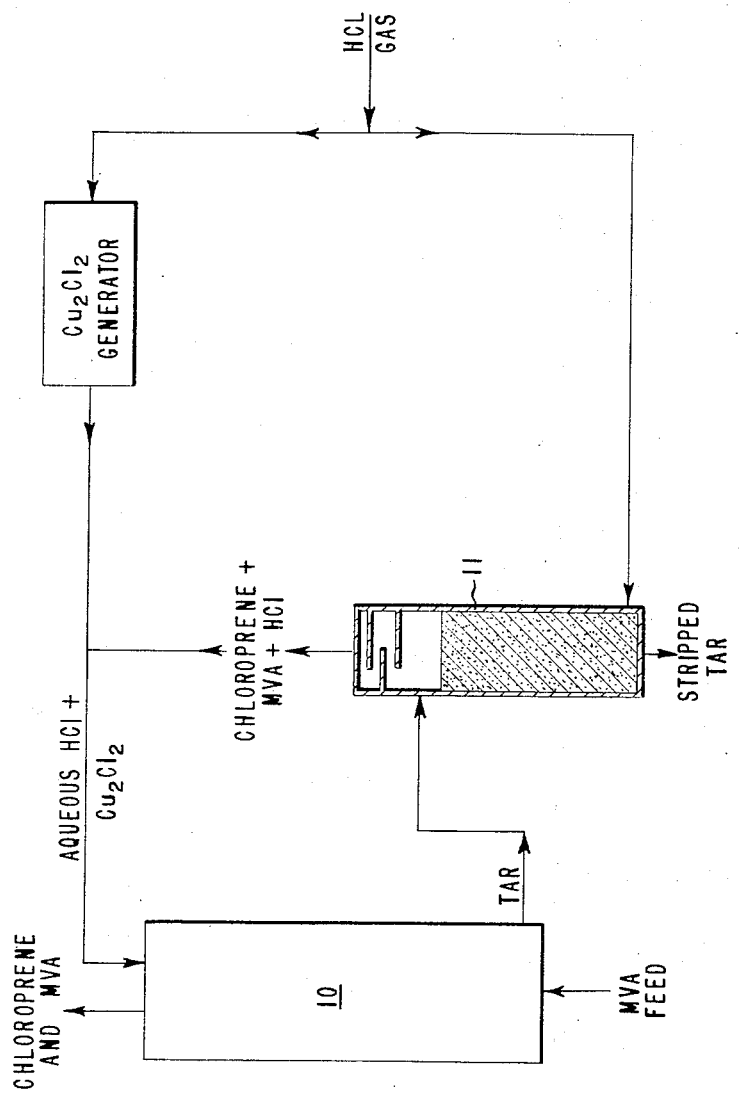
INVENTOR
MARK LOCKERBEE CROSSWAIT
BY Francis A. Painter
ATTORNEY United States Patent Office 3,361,836
Patented Jan. 2, 1968

3,361,836
PREPARATION OF CHLOROPRENE
Mark Lockerbee Crosswait, Whitehall, Mich., assignor to E. I. du Pont de Nemours and Company, Wilmington, Del., a corporation of Delaware
Filed Nov. 13, 1964, Ser. No. 410,907
2 Claims. (Cl. 260—655)

This invention relates to the manufacture of chloroprene from monovinylacetylene and hydrogen chloride and, more particularly, to an improvement in that process.

Chloroprene (i.e., 2-chlorobutadiene-1,3) is usually made by passing monovinylacetylene and hydrogen chloride through an aqueous catalyst solution of cuprous chloride and ammonium or potassium chloride. The reaction is carried out continuously at a temperature such that the chloroprene produced is removed as vapor from the catalyst. Since the chloroprene can react further with hydrogen chloride to form the less useful 1,3-dichlorobutene-2, the monovinylacetylene is used in excess in order to decrease the formation of this by-product. As thus carried out, the vapor phase leaving the catalyst is mostly chloroprene and monovinylacetylene (the latter being then separated and re-circulated), while the dichlorobutene and other non-volatile or slightly volatile by-products, referred to as "tar," accumulate as a separate phase in the catalyst solution. This insoluble phase, which is removed, contains dissolved monovinylacetylene and chloroprene. Since a convenient and economical method has not been available for separating and utilizing this residual monovinylacetylene and chloroprene, it has usually been left with the by-products and not recovered. A practical method for recovering them is therefore needed.

It has been found that the process for producing chloroprene by reacting hydrogen chloride (HCl) with monovinylacetylene (MVA) in the presence of an aqueous cuprous chloride catalyst scolution wherein a "tar" phase is formed can be greatly improved by passing at least a portion of the feed HCl gas in stripping relation through the "tar" phase thereby separating as volatiles any MVA and chloroprene therefrom along with the HCl and passing all the volatiles into the catalyst solution in the reactor.

The contact between the hydrogen chloride and the water-insoluble less-volatile by-product phase, referred to as the "tar," which separates from the catalyst, may be made in any conventional way for stripping a liquid with a gas. Since the tar has a rather low viscosity at operating temperatures, no agitation has to be provided except that furnished by the passage of the gas. On the other hand, entrainment of the liquid in the gas must be controlled by a system of baffles or other means. The operation of passing hydrogen chloride through the tar "in stripping relation" is described in the example in terms of passing the tar through a partly packed column countercurrent to a rising flow of the gas. Obviously, other arrangements may be used, such as a sieve-plate column.

While the stripping temperature is not critical, stripping is more efficient at higher temperatures, and the range between 25° and 60° C. is preferred. It is often satisfactory to introduce the tar at the temperature at which it comes from the reactor. For further adjustment of the temperature, particularly if a higher temperature is desired, the tar and hydrogen chloride may be preheated or the stripping column may be jacketed.

After stripping the tar, the hydrogen chloride gas and the monomers stripped from the tar, are returned to the cuprous chloride catalyst.

The invention will now be described in the following specific example in connection with the accompanying drawing illustrating a specific process flowsheet; parts and percentages are by weight unless otherwise specified.

EXAMPLE

In a reaction vessel 10, chloroprene is prepared by the reaction of aqueous cuprous chloride and HCl with monovinyl acetylene, following, for example, the procedure described in U.S. Patent No. 2,221,941, until the reactor 10 contains a liquid layer which separates from the aqueous cuprous chloride catalyst solution. The separated, water-insoluble liquid layer (called "tar") is removed from the catalyst solution and passed at about 40° C. to a stripping column 11 comprising a vertical pipe 10 inches in diameter and 8 feet long, with the lower part filled with 2-inch Raschig rings. The tar to be stripped is introduced above the level of the rings and after stripping is drained from the bottom continuously by means of an overflow U leg. Dry gaseous HCl for stripping is introduced near the bottom of the column at the rate of 2 pounds per pound of tar per hour. The volatiles are discharged from the top of the column past baffles to prevent carry-over of the tar. The discharged HCl gas containing the monovinylacetylene and chloroprene stripped from the tar, is recycled to the reaction vessel containing the aqueous cuprous chloride solution, along with fresh HCl and monovinylacetylene. The tar to be stripped typically contains about 15% of dissolved monovinylacetylene and about 35% of chloroprene, along with 1,3-dichlorobutene-2 and other products. After stripping, the tar typically contains about 2% of monovinylacetylene and about 20% of chloroprene. There is no criticality in the portion of the feed HCl that is fed through the stripping column 11; however, by experimentation it will be determined that an optimum amount of HCl gas should be used to recover the desired amount of volatiles from the tar depending upon the process conditions as well as the concentration of volatiles in the unstripped tar.

As many widely different embodiments of this invention may be made without departing from the spirit and scope thereof, it is to be understood that this invention is not limited to the specific embodiments thereof except as defined in the appended claims, and all changes which come within the meaning and range of the equivalence are intended to be embraced therein.

What is claimed is:

1. In a process for producing chloroprene by reacting hydrogen chloride and monovinylacetylene in the presence of an aqueous cuprous chloride catalyst solution introduced into a reaction vessel wherein a water-insoluble, less-volatile by-product phase forms in said reaction vessel and is separated from said catalyst solution, the improvement of passing at least a portion of the hydrogen chloride gas in stripping relation through said by-product phase thereby separating as volatiles monovinylacetylene and chloroprene therefrom along with the hydrogen chloride, and passing all of said volatiles into said catalyst solution being introduced into said reaction vessel.

2. A process as defined in claim 1 wherein said stripping step is conducted at 25° to 60° C.

References Cited
UNITED STATES PATENTS

| | | | |
|---|---|---|---|
| 1,950,434 | 3/1934 | Downing et al. | 260—655 |
| 2,178,737 | 11/1939 | Carothers et al. | 260—655 |
| 2,207,784 | 7/1940 | Carter | 260—655 |
| 2,221,941 | 11/1940 | Carter et al. | 260—655 |
| 2,434,094 | 1/1948 | Axe | 260—663 |
| 2,945,897 | 7/1960 | Eisenlohr | 260—663 |

LEON ZITVER, Primary Examiner.

H. MARS, K. V. ROCKEY, Assistant Examiners.